United States Patent
Jiang et al.

(10) Patent No.: US 7,524,586 B2
(45) Date of Patent: Apr. 28, 2009

(54) MATERIALS FOR NEGATIVE ELECTRODES OF LITHIUM ION BATTERIES

(75) Inventors: Wenfeng Jiang, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 566 days.

(21) Appl. No.: 11/137,900

(22) Filed: May 25, 2005

(65) Prior Publication Data

US 2006/0040183 A1 Feb. 23, 2006

(30) Foreign Application Priority Data

Aug. 17, 2004 (CN) .................. 2004 1 0051183

(51) Int. Cl.
 H01M 4/58 (2006.01)
 H01M 4/62 (2006.01)
 H01B 1/04 (2006.01)
 B05D 5/12 (2006.01)
 B32B 15/00 (2006.01)

(52) U.S. Cl. .................. 429/231.95; 429/232; 252/503; 427/122; 428/403

(58) Field of Classification Search ............ 429/231.95, 429/232; 252/182.1, 503; 427/122; 428/403
See application file for complete search history.

(56) References Cited

U.S. PATENT DOCUMENTS 6,383,686 B1 * 5/2002 Umeno et al. ............ 429/231.8

* cited by examiner

Primary Examiner—Patrick Ryan
Assistant Examiner—Thomas H. Parsons
(74) Attorney, Agent, or Firm—Venture Pacific Law, PC

(57) ABSTRACT

The present invention provides materials for negative electrodes of lithium rechargeable batteries. These materials include lithium alloy composites. Each lithium alloy composite has a core-shell structure with one or more lithium alloy granules as its core and a carbon material as its shell. The average granule diameter of the lithium alloy granule is between 5 μm and 40 μm. The average thickness of the shell layer is between 50 Å and 1000 Å. The average diameter of the lithium alloy composite is between 10 μm to 50 μm. The methods of fabrication for the material includes the following steps: stirring lithium alloy granules in an organic solution with a coating substance, drying the solid product in the organic solution with a coating substance, calcining the dried product to obtain the negative electrode material with lithium alloy composites.

18 Claims, 1 Drawing Sheet

MATERIALS FOR NEGATIVE ELECTRODES OF LITHIUM ION BATTERIES

CROSS REFERENCE

This application claims priority from a Chinese patent application entitled "Materials of Lithium Alloy Composites, Their Methods of Fabrication, Materials for Negative Electrodes, Physical Structure for Negative Electrodes and Lithium Secondary Batteries" filed on Aug. 17, 2004, having a Chinese Application No. 200410051183.6. This Chinese application is incorporated herein by reference in its entirety.

FIELD OF INVENTION

This invention relates to materials for negative electrodes of lithium rechargeable batteries and the fabrication methods of these materials.

BACKGROUND

The lithium ion battery is a relatively new and environmentally friendly electro-chemical energy source. When compared with the traditional nickel cadmium battery and nickel hydrogen battery, a lithium ion battery has the advantages of having higher voltage, longer life, and large energy density. It is also lightweight, has no memory effects, and is less harmful to the environment. Because of these superior characteristics, the lithium ion battery has developed rapidly and is now widely used in portable equipment.

The negative electrode of traditional lithium ion batteries uses graphitized carbon materials such as natural graphite, artificial graphite, and non-graphitized carbon materials such as non-graphitized charcoal, charcoal obtained from oxidizing macromolecule materials of poly-hydrocarbon at high temperatures, pyrolytic carbon, coke, calcined organic macromolecule, and active carbon. However, these carbon materials form a SEI (surface electrolyte interface) on the surface layer of the carbon material during the initial charging process. The formation of the SEI and other reactions in the electrolyte reduces the initial charge-discharge electrical efficiency and affect the performance of a battery's capacity.

Adding a quantity of lithium alloy to the material for the negative electrode can effectively solve the problem of decreasing battery capacity resulting from the reduction of initial charge-discharge electrical efficiency. However, this volume of the added lithium alloy will expand with the continuous charge-discharge process of a battery. This will cause the loosening of materials in the electrode, and can even cause the material of the electrode to detach. This process also increases the internal resistance and affects the cycling properties of the battery.

Due to the limitations of the prior art, it is therefore desirable to have novel materials and novel methods of fabricating materials for negative electrodes such that, when these materials are used in negative electrodes of batteries, produces batteries with excellent initial charge-discharge efficiency, large battery capacity, and long cycling life.

SUMMARY OF INVENTION

An object of this invention is to provide materials for negative electrodes such that batteries with these materials as negative electrodes have excellent initial charge-discharge efficiency, large battery capacity, and long cycling life.

Another object or this invention is to provide materials for negative electrodes that contain lithium alloys that can effectively limit the volume expansion of lithium alloys.

Another object of this invention is to provide materials for negative electrodes that will improve the cycling properties of lithium rechargeable batteries.

Another object of this invention is to provide methods of fabrication for the materials of negative electrodes such that the resulting batteries have excellent initial charge-discharge efficiency, large battery capacity and long cycling life.

Another object of this invention is to provide methods of fabrication for the materials of negative electrodes that contain lithium alloy but that can effectively limit the volume expansion of the lithium alloys.

Another object of this invention is to provide methods of fabrication for the materials of negative electrodes that will improve the cycling properties of lithium rechargeable batteries.

Briefly, the presently preferred embodiment of this invention provides materials for negative electrodes that contain lithium alloy composites. Each lithium alloy composite has a core-shell structure where said core comprises of one or more lithium alloy granules and said shell comprises a carbon material carbon. The average granule diameter of said lithium alloy granules is between 5 μm and 40 μm. The average thickness of said shell is between 50 Å and 1000 Å. The average diameter of said lithium alloy composite is between 10 μm to 50 μm. The concentration of lithium in said lithium alloy is between 10 wt % and 40 wt % of the alloy. The methods of fabrication for said material includes the following steps: stirring said lithium alloy granules in an organic solution with a coating substance to form a solid product, drying the solid product, calcining the dried product to obtain the negative electrode material with lithium alloy composites. The lithium alloy composites fabricated by the above stated method have lithium alloy granules as a core coated with a shell of carbon material.

An advantage of this invention is that batteries using the materials for negative electrodes of this invention or are fabricated by the methods of this invention have excellent initial charge-discharge efficiency, large battery capacity and long cycling life.

Another advantage of this invention is that the materials for negative electrodes are fabricated by the methods of this invention, where the materials contain lithium alloys can effectively limit the volume expansion of the lithium alloys.

Another advantage of this invention is that batteries using the materials for negative electrodes of this invention or are fabricated by the methods of this invention have improved cycling properties.

DESCRIPTION OF DRAWINGS

The foregoing and other objects, aspects and advantages of the invention will be better understood from the following detailed description of the preferred embodiments of this invention when taken in conjunction with the accompanying drawings in which.

DETAILED DESCRIPTION OF THE PREFERRED EMBODIMENTS

Figure 1:
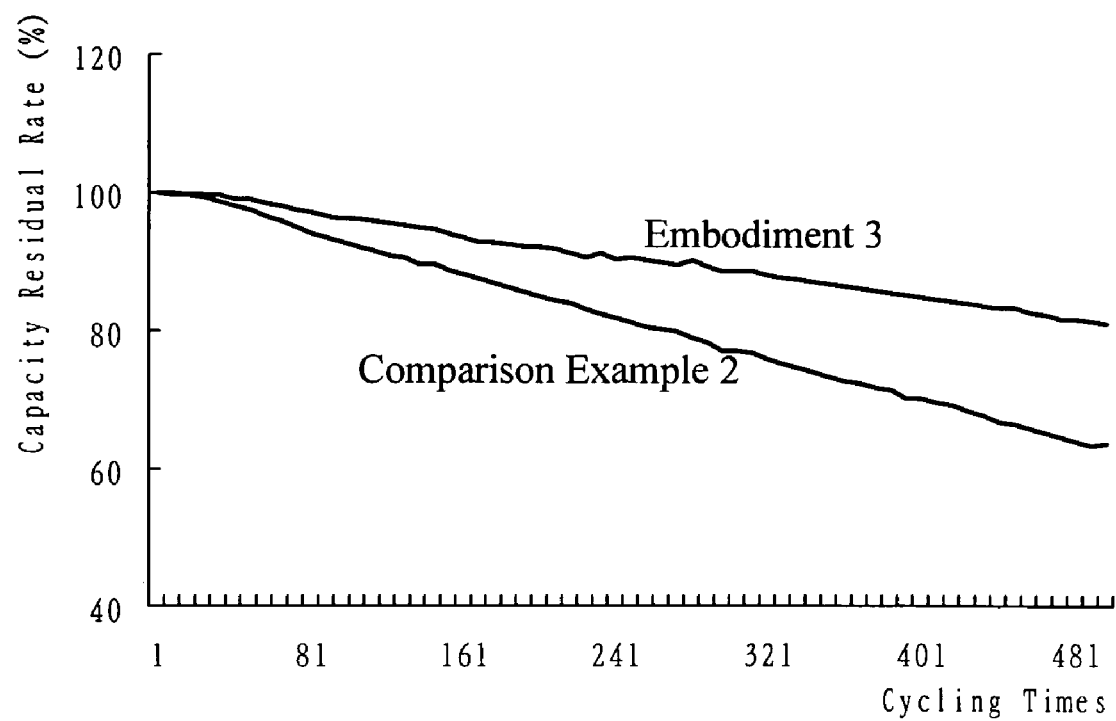
FIG. 1 is a diagram comparing the capacity residual rate of a lithium rechargeable battery whose negative electrode is an embodiment of this invention with that of a lithium rechargeable battery whose negative electrode does not include the lithium alloy composites of this invention.

The presently preferred embodiments of the present invention relates to materials for negative electrodes that include lithium alloy composites. Each lithium alloy composite has a core-shell structure where the core comprises of one or more lithium alloy granules and the shell comprises of carbon materials (first carbon material). In preferred embodiments, the shell comprises of amorphous carbon. The average granule diameter of said lithium alloy granules is between 5 μm and 40 μm. The average thickness of the shell is between 50 Å and 1000 Å. The average diameter of said lithium alloy composite is between 10 μm to 50 μm In the preferred embodiments, said lithium alloy is an alloy formed by lithium and at least one metal selected from the following: Be, Mg, Ti, Zr, V, Nb, Cr, Cu, Al. The concentration of lithium in said lithium alloy is between 10 wt % and 40 wt %.

The embodiments of the lithium alloy composites have one or more lithium alloy granules. In preferred embodiments, the granule diameter is between 5 μm and 40 μm and the average diameter of said lithium alloy composite is between 10 μm to 50 μm. The granule diameter of carbon materials for negative electrodes of lithium rechargeable batteries is usually in the tens of μm. If the granule diameter of the lithium alloy granules is too large, the volume of the coated granule will be too big for dip coating. If the granule diameter is too small, it will be coated with too much carbon materials such that the lithium in the lithium alloy cannot be fully utilized.

The average thickness of the shell is determined by the difference between the average granule diameters of the granules before and after coating with carbon materials. That is, the average thickness of carbon shell=(the average granule diameter of the lithium alloy composites−the average granule diameter of the lithium alloy granules before coating with carbon materials)/2. In the preferred embodiments, the average thickness of the shell of carbon materials is between 50 Å and 1000 Å. If the thickness of shell is too thin, it cannot form an effective coating on the lithium alloy granules. If the thickness of shell is too thick, it will affect the detachment of the lithium in the lithium alloy granules.

The optimal selection for the concentration of the lithium metal in the lithium alloy granules is between 10 wt % and 40 wt % of the lithium alloy. If the concentration of non-lithium metals is too high, there will be too few detached lithium ions and the amount of material needed for negative electrodes will have to be increased. When the concentration of non-lithium metals is too low, the fabrication of the lithium alloy becomes more difficult. It is impossible to fabricate these materials in air when the concentration of lithium is too high. This imposes stringent environmental requirements for the fabrication process and increases the cost of a battery. Moreover, a high concentration of lithium causes the melting point of the lithium alloy to be too low making the coating of the lithium alloy granules difficult. The above stated optimal range for the concentration of the lithium metal allows the lithium alloy granules to be handled in dry air and reduces the fabrication cost.

There is no special limitation on the lithium alloy to be used as the core of the lithium alloy composite. Customary lithium alloys that can store lithium used in negative electrodes can be selected. Examples are alloys that are comprised of lithium and at least one metal from the following: Be, Mg, Ti, Zr, V, Nb, Cr, Cu and Al.

The embodiments for the methods of fabrication for said material includes the following steps:

soaking lithium alloy granules in an organic solution with a coating substance;

stirring said granules in said organic solution with said coating substance to form a coated solid product in a liquid;

drying said coated solid product; and calcining said dried product to obtain lithium alloy composites in a material for negative electrodes.

In the preferred embodiments of the methods of fabrication, the average granule diameter of said lithium alloy granules is between 5 μm and 40 μm. Said lithium alloy is an alloy formed by lithium and at least one metal is selected from the following: Be, Mg, Ti, Zr, V, Nb, Cr, Cu, Al. The concentration of lithium in said lithium alloy is between 10 wt % and 40 wt %.

During the fabrication process of the preferred embodiments, said lithium alloy granules are stirred for 1 to 6 hours in the organic solution with coating material. The solid product is obtained by separation from the liquid and dried with heat in an inert environment such as one or more inert gases. The calcination of the dried coated solid product is conducted in a furnace in an inert environment with one or more inert gases at between 500° C. and 1200° C. for 4 hours to 10 hours. A typical inert gas used in the drying step and the calcinations step is argon.

The coating substances are carbon-materials (third carbon material) such as pitch, resin, or organic polymer. The organic solution can be a solvent such as tetrahydrofuran. The preferred concentration of the coating substance in said organic solution is between 3% and 20%. In one typical embodiment, the concentration of the coating substance, pitch, is between 3% and 10% in an organic solution of tetrahydrofuran.

The preferred embodiments of said material for negative electrodes have a predetermined quantity of lithium alloy composites. Each lithium alloy composite comprise of one or more lithium alloy granules coated with a shell of carbon materials fabricated at high temperatures. In a typical embodiment, the shell structure is obtained by the following steps: using a deposition reaction method to deposit a layer of pre-product compounds on the surface of the lithium alloy granules; after growing along the base, coating the lithium alloy granules to form a sphere; using solid phase charring technology at a pre-determined temperature to obtained the shell structure.

This lithium alloy composite can limit the expansion of lithium alloy thereby improving the cycling properties of batteries using these embodiments as materials for their negative electrodes. Since the lithium alloy composites have Li that are uniformly mixed in the active material of the negative electrode, when a battery is charged, the active material for negative electrode first react with the lithium alloy. The Li in the lithium alloy granules is detached first and mixed in the active material of the negative electrode. As a result, much less lithium ions are detached from the positive electrode in the irreversible reaction to form the SEI. The specific capacity of Li is 4000 mAh/g. Even if the detached lithium ions in the lithium alloy is far greater than that in the graphite or other active material for the negative electrode, since the theoretical specific capacity of natural graphite is only 372 mAh/g, these lithium ions can effectively compensate for the loss of lithium ions in the active material of the positive electrode from the irreversible reaction. This can increase the rate of use of active material of positive electrode, increase the initial charge-discharge electrical efficiency, and also increase the capacity of a battery.

In embodiments, in addition to said lithium alloy composites, said materials also comprises of active materials for negative electrodes. There is no special limitation on the active materials. Customary active materials for negative electrodes used in current technology such as carbon containing substances can be used.

In preferred embodiments, the active materials can be carbon materials where the concentration of said lithium alloy composites in said active material for negative electrodes is between 0.5 wt % and 20 wt %. These carbon materials (second carbon material) can be one or more material selected from the following: graphitized carbon, non-graphitized carbon, graphite, charcoal obtained from oxidizing macromolecule materials of poly hydrocarbon at high temperatures, pyrolytic carbon, coke, calcined organic macromolecule, and active carbon. The calcined organic macromolecule material can be the products obtained from the calcination and carbonation of phenol formaldehyde resin, epoxy resin etc. at appropriate temperatures. The optimal selection is graphitized carbon material.

Preferably, the concentration of the lithium alloy composites is between 0.5 wt % and 20 wt % of the active material for the negative electrode. If the concentration of lithium alloy composites is too small, the quantity of detached lithium ions is small and their effect on the charge-discharge efficiency of the battery is limited. A higher percentage of lithium alloy composites will reduce the quantity of active material and affect the actual capacity of a battery.

In preferred embodiments, the negative electrode of a battery can be fabricated by dip coating the current collector of the negative electrode with the paste comprising of the materials for negative electrodes that are embodiments of this invention. Copper foil can be used for the current collector of the negative electrode. The negative electrode is fabricated using the following steps: adding and uniformly mixing predetermined lithium alloy composites, binding agent, and appropriate solvent into the carbon materials (second carbon material); and dip coating the mixture onto the copper foil to form the negative electrode. There is no special limitation on said binding agent and solvent. Usually, publicly known binding agent and solvent in the fabrication of negative electrodes for lithium ion batteries are used.

A lithium rechargeable battery can be fabricated using the materials for negative electrodes that are embodiments of this invention. This lithium rechargeable battery includes a positive electrode, a negative electrode and non-aqueous electrolyte.

Generally speaking, a positive electrode includes a current collector and the active material for positive electrodes on the current collector. Aluminum foil or nickel foil can be used for the current collector. There is no specific limitation for the active material for the positive electrode. It generally comprise of active materials that can embed and detach lithium ions. It can be selected from metal sulfides or oxides. For example, it can be one or more compounds selected from the following: $TiS_2$, $MoS_2$, $V_2O_5$ and compounds of lithium oxide material. Said compounds of lithium oxide has $LiM_xO_2$ as its principal component where M is at least one element selected from following: Co, Ni, Mn, Fe, Al, V and Ti. The range I of x is between 0.05 and 1.10. The optimal selection of said active materials for positive electrodes is laminate compounds of oxide containing Li. These compounds of lithium oxide can produce high voltages and can be the active material for positive electrodes that has excellent energy density. The material for positive electrodes can also contain binding agent, solvent, as well as conducting agent. There is no special limitation on the methods to fabricate positive electrodes. Dip coating is one of the methods that can be used.

There is no specific requirement for the non-aqueous electrolyte. The usual electrolytes for lithium rechargeable batteries can be used. Examples are non-aqueous electrolytes with one or more electrolyte solute selected from the following: $LiPF_6$, $LiBF_4$, $LiAsF_6$, $LiClO_4$, $LiCH_3SO_3$, $LiN(SO_2CF_3)_2$, $LiC(SO_2CF_3)_3$, $LiAlCl_4$, $LiSiF_6$, $LiB(C_6H_5)_4$, LiCl and LiBr.

The following embodiments and embodiments further describe this invention.

COMPARISON EXAMPLE 1

The fabrication of the negative electrodes comprises of the following steps:

adding 3 units of polyvinylidene fluoride (PVDF) as binding agent, and a predetermined quantity of tetrahydrofuran to graphite that are produced in China as active material for the negative electrode;

stirring to mix uniformly;

dip coating said mixture onto copper foils that are 10 μm thick;

drying, and pressing to form the negative electrode slice.

The fabrication of positive electrodes comprises of the following steps:

adding 100 units of lithium cobalt oxide ($LiCoO_2$) as the active material for positive electrodes, 3 units of polyvinylidene fluoride (PVDF) powder as binding agent, and, 15 units of acetylene black as conducting agent;

stirring to the added mixture to mix uniformly in solvent N-methyl pyrrolidone (NMP);

dip coating onto the aluminum foil that are 20 μm thick;

drying; and pressing to form the positive electrode slice.

The fabrication of the electrolyte comprises of the following steps:

preparing the solvent for the electrolyte by adding ethyl carbonate(EC) and diethyl carbonate (DEC) in the ratio of ethyl carbonate (EC): diethyl carbonate (DEC)=1:1;

adding a predetermined quantity of $LiPF_6$ to said solvent to form the electrolyte with a concentration of $LiPF_6$ of 1 mol/l.

The battery in this comparison example is fabricated by:

stacking and separating the negative electrode, positive electrode, and separation membrane, winding, and injecting the electrolyte to produce the LP053048 type lithium rechargeable battery.

Sample #1 of Embodiment 1

The lithium alloy composites of Sample #1 of Embodiment 1 is fabricated in a method comprising of the following steps:

soaking a predetermined quantity of aluminum lithium alloy granules with an average granule diameter of 30 μm in a solution of 5% concentration of pitch in tetrahydrofuran;

stirring said aluminum lithium alloy granules in said solution of pitch in tetrahydrofuran for 2 hours to form a solid product in a liquid, separating the solid product from the liquid;

drying the solid product with heat in argon gas;

calcining the dried product in a calcination furnace at 500° C. for 4 hours in an argon atmosphere to obtain the aluminum alloy composite, where each aluminum alloy composite is one or more aluminum lithium alloy granules coated with carbon material.

In the fabrication of negative electrodes in this sample in Embodiment 1, 100 units of graphite produced in China is used as the active material for negative electrodes. In addition, 2 units of aluminum lithium alloy composites are added to the material for the negative electrode. Everything else remains the same as the fabrication of the negative electrode in the Comparison Example 1.

To obtain Sample #1 of this Embodiment, the fabrication of the positive electrode, electrolyte and battery are same as that in Comparison Example 1. Only the material for the negative electrode is changed as described above.

Sample #2 of Embodiment 1

To obtain Sample #2, 4 units of aluminum lithium alloy composites are added to the material for the negative electrode. Everything else remains the same as Sample No. 1.

Sample #3 of Embodiment 1

To obtain Sample #3, 6 units of aluminum lithium alloy composites are added to the material for the negative electrode. Everything else remains the same as Sample No. 1.

Sample #4 of Embodiment 1

To obtain Sample #4, 8 units of aluminum lithium alloy composites are added to the material for the negative electrode. Everything else remains the same as Sample No. 1.

Sample #5 of Embodiment 1

To obtain Sample #5, 10 units of aluminum lithium alloy composites are added to the material for the negative electrode. Everything else remains the same as Sample No. 1.

Sample #6 of Embodiment 1

To obtain Sample #6, 12 units of aluminum lithium alloy composites are added to the material for the negative electrode. Everything else remains the same as Sample No. 1.

Sample #7 of Embodiment 1

To obtain Sample #7, 14 units of aluminum lithium alloy composites are added to the material for the negative electrode. Everything else remains the same as Sample No. 1.

Sample #8 of Embodiment 1

To obtain Sample #8, 16 units of aluminum lithium alloy composites are added to the material for the negative electrode. Everything else remains the same as Sample No. 1.

Sample #9 of Embodiment 1

To obtain Sample #9, 18 units of aluminum lithium alloy composites are added to the material for the negative electrode. Everything else remains the same as Sample No. 1.

Sample #10 of Embodiment 1

To obtain Sample #10, 20 units of aluminum lithium alloy composites are added to the material for the negative electrode. Everything else remains the same as Sample No. 1.

Testing of the Electrochemical Properties of the Samples and Comparison Examples Batteries from the Comparison Example 1 and the samples of Embodiment 1 are charged at a constant voltage. The current in these batteries is limited to 0.05C (30 mA). The final voltage is 4.2V. After charging, the batteries are discharged at a constant current. The discharging current is 0.05C (30 mA). The cut-off voltage is 3V. The results of the testing are shown in Table 1.

TABLE 1

| No. | Active Material for Negative Electrodes:Alloy Granules coated with Carbon Material | Initial Charging-Discharging Rate (%) | Discharge Capacity (mAh/g) | |
|---|---|---|---|---|
| | | | The first cycle | The second cycle |
| Comparison Example 1 | 100:0 | 85.3 | 605.2 | 610.6 |
| Embodiment 1 No. 1 | 100:2 | 87.3 | 611.1 | 612.5 |
| No. 2 | 100:4 | 89.2 | 618.7 | 619.4 |
| No. 3 | 100:6 | 90.3 | 627.2 | 627.5 |
| No. 4 | 100:8 | 91.6 | 631.3 | 631.2 |
| No. 5 | 100:10 | 93.4 | 642.6 | 637.1 |
| No. 6 | 100:12 | 99.7 | 661.2 | 636.2 |
| No. 7 | 100:14 | 105.9 | 671.8 | 622.1 |
| No. 8 | 100:16 | 120.1 | 687.4 | 616.2 |
| No. 9 | 100:18 | 157.9 | 695.9 | 601.6 |
| No. 10 | 100:20 | 195.3 | 711.2 | 600.4 |

The results of the testing indicate that adding aluminum lithium alloy composites to the active materials for negative electrodes increase the initial charging-discharging rate of the batteries. The capacity of the second cycle is reduced when the concentration of the aluminum lithium alloy composites is too high. This indicates a reduction in the capacity of carbon materials for the negative electrodes.

Sample #11 of Embodiment 2

In the fabrication of the negative electrode of this sample in Embodiment 2, 100 units of graphite produced in China is used as the active material for the negative electrode. In addition, 8 units of beryllium lithium alloy composites are added to the material for the negative electrode. Each beryllium lithium alloy composite is one or more beryllium lithium alloy granules coated with carbon material where the average granule diameter of the beryllium lithium alloy granule is 16 μm. The beryllium Be is 70 wt % of the beryllium lithium alloy. Everything else remains the same as the fabrication of the negative electrode and the battery in the Comparison Example 1.

Sample #12 of Embodiment 2

To obtain Sample #12, 8 units of magnesium lithium alloy composite are added to the material for the negative electrode. Each magnesium lithium alloy composite is one or more magnesium lithium alloy granules coated with carbon material where the average granule diameter of magnesium lithium alloy granule is 20 μm. The magnesium Mg is 70 wt % of the magnesium lithium alloy. Everything else remains the same as Sample No. 11.

Sample #13 of Embodiment 2

To obtain Sample #13, 8 units of titanium lithium alloy composites are added to the material for the negative electrode. Each titanium lithium alloy composite is one or more titanium lithium alloy granules coated with carbon material where the average granule diameter of the titanium lithium alloy granule is 18 μm. The titanium Ti is 70 wt % of the titanium lithium alloy. Everything else remains the same as Sample No. 11.

Sample #14 of Embodiment 2

To obtain Sample #14, 8 units of zirconium lithium alloy composite are added to the material for the negative electrode. Each zirconium lithium alloy composite is one or more zirconium lithium alloy granules coated with carbon material where the average granule diameter of the zirconium lithium alloy granule is 14 μm. The zirconium Zr is 70 wt % of the zirconium lithium alloy. Everything else remains the same as Sample No. 11.

Sample #15 of Embodiment 2

To obtain Sample #15, 8 units of vanadium lithium alloy composites are added to the material for the negative electrode. Each of the vanadium lithium alloy composite is one or more vanadium lithium alloy granules coated with carbon material where the average granule diameter of the vanadium lithium alloy granule is 15 μm. The vanadium V is 70 wt % of the vanadium lithium alloy. Everything else remains the same as Sample No. 11.

Sample #16 of Embodiment 2

To obtain Sample #16, 8 units of niobium lithium alloy composites are added to the material for the negative electrode. Each niobium lithium alloy composite is one or more niobium lithium alloy granules coated with carbon material where the average granule diameter of the niobium lithium alloy granule is 13 μm. The niobium Nb is 70 wt % of the niobium lithium alloy. Everything else remains the same as Sample No. 11

Sample #17 of Embodiment 2

To obtain Sample #17, 8 units of chromium lithium alloy composites are added to the material for the negative electrode. Each chromium lithium alloy composite is one or more chromium lithium alloy granules coated with carbon material where the average granule diameter of the chromium lithium alloy granule is 17 μm. The chromium Cr is 70 wt % of the chromium lithium alloy. Everything else remains the same as Sample No. 11.

Sample #18 of Embodiment 2

To obtain Sample #18, 8 units of copper lithium alloy composites are added to the material for the negative electrode. Each copper lithium alloy composite is one or more copper lithium alloy granules coated with carbon material where the average granule diameter of the copper lithium alloy granule is 19 μm. The copper Cu is 70 wt % of the copper lithium alloy. Everything else remains the same as Sample No. 11.

Testing of the Electrochemical Properties of the Samples and Comparison Examples The testing protocol for the electrochemical properties of these samples in Embodiment 2 is the same as the samples in Embodiment 1. The results are shown in Table 2.

TABLE 2

Comparison between Embodiment 2 and Comparison Example 1

| | | Li-M alloys | | Active Materials | | Discharge | |
| --- | --- | --- | --- | --- | --- | --- | --- |
| | | M Content | Alloy | for Negative | Initial | Capacity (mAh/g) | |
| No. | M | (of Granules wt %) | Core Diameter (μm) | Electrodes: Alloys Composites (wt %) | Charge-Discharge Rate (%) | The First Cycle | The Second Cycle |
| Comparison Example 1 | — | — | — | 100:0 | 85.3 | 605.2 | 610.6 |
| Embodiment 2 No. 11 | Be | 70 | 16 | 100:8 | 98.2 | 631.2 | 604.1 |
| No. 12 | Mg | 70 | 20 | 100:8 | 97.5 | 618.7 | 616.5 |
| No. 13 | Ti | 70 | 18 | 100:8 | 97.6 | 625.3 | 615.8 |
| No. 14 | Zr | 70 | 14 | 100:8 | 96.8 | 611.3 | 606.1 |
| No. 15 | V | 70 | 15 | 100:8 | 98.4 | 640.1 | 631.3 |
| No. 16 | Nb | 70 | 13 | 100:8 | 98.1 | 631.7 | 323.2 |
| No. 17 | Cr | 70 | 17 | 100:8 | 97.4 | 625.8 | 624.7 |
| No. 18 | Cu | 70 | 19 | 100:8 | 95.1 | 603.4 | 602.3 |

The results of the testing show that effects of Be, Mg, Ti, Zr, V, Nb, Cr and Cu are the same. When they formed an alloy with Li, they can effectively increase the initial charging-discharging rate and capacity of batteries.

COMPARISON EXAMPLE 2

100 units of graphite produced in China is used as the active material for the negative electrode. In addition, 8 units of aluminum lithium alloy granules without a coating of carbon material is added. Everything else remains the same as the Comparison Example 1.

Embodiment 3

100 units of graphite produced in China is used as the active material for the negative electrode. In addition, 8 units of aluminum lithium alloy composites are added. Each aluminum lithium alloy composite is one or more aluminum lithium alloy granules coated with carbon material where the average granule diameter of the aluminum lithium alloy granule is 16 µm. Everything else remains the same as the Comparison Example 1.

Testing of Cycling Properties

The cycling properties of the batteries using the materials describe in Embodiment 3 and Comparison Example 2 are negative electrodes are tested as follows. Each battery is charged at constant voltage. The current is limited to 1 C(600 mA). The final voltage is 4.2V. The discharge is at constant current. The discharging current is 1C(600 mA). The cut-off discharging voltage of is 3V. Each battery is cycled for 500 times. The capacity residual rate percent is the percent ratio of discharge capacity to the initial discharge capacity. The results of the testing are shown in FIG. 1.

FIG. 1 shows that adding lithium alloy composites improve the cycling properties of a battery.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

The invention claimed is;

1. A material for negative electrodes having a plurality of lithium alloy composites, wherein each of said lithium alloy composites comprises:
   a core having at least one lithium alloy granule, wherein the average granule diameter of said lithium alloy granule is between 5 µm to 40 µm; and
   a shell coating said core, wherein said shell comprising a first carbon material.

2. The material for negative electrodes of claim 1 wherein the average diameter of said lithium alloy composite is between 10 µm to 50 µm 3. The material for negative electrodes of claim 1 wherein the average thickness of said shell is between 50 Å and 1000 Å.

4. The material for negative electrodes of claim 1 wherein said lithium alloy granule comprises of lithium and at least one metal selected from the group consisting of: Be, Mg, Ti, Zr, V, Nb, Cr, Cu, and Al.

5. The material for negative electrodes of claim 1 wherein the concentration of said lithium in said lithium alloy granule is between 10 wt % and 40 wt %.

6. The material for negative electrodes of claim 1 wherein said first carbon material is amorphous carbon.

7. The material for negative electrodes of claim 1 further comprises of an active material having a second carbon material selected from the group consisting of: non-graphitized carbon, graphite, pyrolytic carbon, coke, calcined organic macromolecule, and active carbon.

8. The material for negative electrodes of claim 1 wherein the concentration of said lithium alloy composites is between 0.5 wt % and 20 wt % of the active material of said material for negative electrodes.

9. A material for negative electrodes, comprising:
   a plurality of lithium alloy composites; and
   at least a second carbon material selected from the group consisting of: non-graphitized carbon, graphite, pyrolytic carbon, coke, calcined organic macromolecule, and active carbon; and wherein
   each of said lithium alloy composites comprises a core having at least one lithium alloy granule and a shell coating said core, wherein said shell comprising amorphous carbon;
   the average granule diameter of said lithium alloy granule is between 5 µm to 40 µm;
   the average diameter of said lithium alloy composite is between 10 µm to 50 µm;
   the average thickness of said shell is between 50 Å and 1000 Å;
   said lithium alloy granule comprises lithium and at least one metal selected from the group consisting of: Be, Mg, Ti, Zr, V, Nb, Cr, Cu, and Al;
   the concentration of said lithium in said lithium alloy granule is between 10 wt % and 40 wt %; and
   the concentration of said lithium alloy composites is between 0.5 wt % and 20 wt % of the active material of said material for negative electrodes.

10. A method for fabricating a material for negative electrodes, comprising the steps of:
    stirring a plurality of lithium alloy granules in an organic solution with a coating substance to form a coated solid product;
    drying said coated solid product;
    calcining said dried product obtain a plurality of lithium alloy composites in a material for negative electrodes.

11. The method for fabricating a material for negative electrodes of claim 10 wherein the average granule diameter of said lithium alloy granule is between 5 µm to 40 µm.

12. The method for fabricating a material for negative electrodes of claim 10 wherein said lithium alloy granule comprises lithium and at least one metal selected from the group consisting of: Be, Mg, Ti, Zr, V, Nb, Cr, Cu, and Al.

13. The method for fabricating a material for negative electrodes of claim 10 wherein the concentration of said lithium in said lithium alloy granule is between 10 wt % and 40 wt %.

14. The method for fabricating a material for negative electrodes of claim 10 wherein said coating substance is at least a third carbon material selected from the group consisting of: resin, pitch, and organic polymer.

15. The method for fabricating a material for negative electrodes of claim 10 wherein the concentration of said coating substance in said organic solution is between 3% and 20%.

16. The method for fabricating a material for negative electrodes of claim 10 wherein in said drying step, said coated solid product is dried in an environment containing substantially one or more inert gases; and, in said calcining step, said dried product is calcined in an environment containing substantially one or more inert gases.

17. The method for fabricating a material for negative electrodes of claim 10 wherein in said calcining step, said dried product is calcined at between 500° C. and 1200° C. for 4 hours to 10 hours.

18. The method for fabricating a material for negative electrodes of claim 10 wherein
    the average granule diameter of said lithium alloy granule is between 5 µm to 40 µm;
    said lithium alloy granule comprises lithium and at least one metal selected from the group consisting of: Be, Mg, Ti, Zr, V, Nb, Cr, Cu, and Al;

the concentration of said lithium in said lithium alloy granule is between 10 wt % and 40 wt %;

said coating substance is at least a third carbon material selected from the group consisting of: resin, pitch, and organic polymer;

the concentration of said coating substance in said organic solution is between 3% and 20%;

in said drying step, said coated solid product is dried in an environment containing substantially one or more inert gases; and, in said calcining step, said dried product is calcined in an environment containing substantially one or more inert gases; and in said calcining step, said dried product is calcined at between 500° C. and 1200° C. for 4 hours to 10 hours.

* * * * *